United States Patent [19]

Fitzgerald

[11] 4,310,192

[45] Jan. 12, 1982

[54] AERODYNAMIC WIND DEFLECTOR FOR A REFRIGERATED TRAILER

[76] Inventor: Joseph M. Fitzgerald, 8690 Los Coyotes Dr., Buena Park, Calif. 90621

[21] Appl. No.: 176,249

[22] Filed: Aug. 7, 1980

[51] Int. Cl.³ .............................................. B62D 35/00
[52] U.S. Cl. ...................................... 296/1 S; 62/239
[58] Field of Search .......................... 296/1 S; 62/239; D12/181; D23/142

[56] References Cited

U.S. PATENT DOCUMENTS

| | | | |
|---|---|---|---|
| D. 258,234 | 2/1981 | Anderson et al. | D23/142 |
| 3,797,879 | 3/1974 | Edwards | 296/1 S |
| 3,934,923 | 1/1976 | Lissaman et al. | 296/1 S |
| 4,078,395 | 3/1978 | Crowe et al. | 62/239 |

*Primary Examiner*—Robert R. Song
*Attorney, Agent, or Firm*—Gordon L. Peterson

[57] ABSTRACT

An apparatus for reducing the aerodynamic drag of a refrigerated trailer of the type having a front wall and a refrigeration unit on the front wall. The apparatus comprises a wind deflector configured to reduce the aerodynamic drag of the refrigerated trailer. The wind deflector is attached to the refrigeration unit for movement between a drag-reducing position and an access position in which the wind deflector is displaced from the drag-reducing position to provide improved access to the refrigeration unit.

20 Claims, 7 Drawing Figures

AERODYNAMIC WIND DEFLECTOR FOR A REFRIGERATED TRAILER

BACKGROUND OF THE INVENTION

Refrigerated cargo carrying vehicles are commonly used to transport goods which must be maintained at less than ambient temperature. For example, a refrigerated trailer pulled by a tractor is commonly used for this purpose.

The interior of a refrigerated trailer is commonly cooled by a refrigeration unit carried on the front or forward wall of the trailer. One common type of refrigeration unit is generally in the form of a relatively large rectangular solid and it projects forwardly from the front wall of the refrigerated trailer.

It is known to reduce the aerodynamic drag of various forms of cargo carrying vehicles. For example, Hersh U.S. Pat. No. 4,021,069 shows an aerodynamic drag-reducing apparatus for mounting on the forward face of a trailer or cargo carrying box of a truck. FitzGerald et al U.S. Pat. No. 4,078,395 and FitzGerald et al U.S. Design Pat. No. D. 245,246 show apparatuses for reducing the aerodynamic drag of a refrigerated trailer. These apparatuses are adapted to be mounted on the trailer and to substantially enclose the refrigeration unit. It is also known to mount drag-reducing apparatuses to both the trailer and the refrigeration unit.

The drag-reducing apparatuses of the FitzGerald et al patents do reduce the aerodynamic drag of the refrigerated trailer to provide a significant savings in fuel. However, these apparatuses have been found to be subject to stresses which can reduce the useful life of the wind deflector.

With the patented constructions, access to the refrigeration unit is provided by a multiplicity of access doors. Although the doors are adequate for many applications, they tend to be damaged and knocked off, they increase the cost of the wind deflector and they do not provide as much access to the refrigeration unit as is sometimes desired.

If the refrigeration unit cannot be repaired quickly, it must be replaced very rapidly to prevent spoilage of the product being transported by the trailer. The time for replacement of the patented units is greater than desired because it is first necessary to disconnect the wind deflector from the trailer and then demount the refrigeration unit.

SUMMARY OF THE INVENTION

This invention provides an apparatus for reducing the aerodynamic drag of a refrigerated cargo carrying vehicle which overcomes the problems noted above. For example, it has been found that attaching the drag-reducing apparatus to both the trailer and the refrigeration unit simultaneously subjects the apparatus to vibrations at significantly different frequencies thereby inducing stresses in the apparatus and tending to shorten its life. To overcome this, the present invention provides for attaching the drag-reducing apparatus solely to the refrigeration unit. Thus, the drag-reducing apparatus is attached to the trailer only via the refrigeration unit. This eliminates the multiple frequency vibration problem noted above. In addition, it materially reduces the time required for replacing the refrigeration unit in that the refrigeration unit and the drag-reducing apparatus can be demounted from the trailer as a unit simply by disconnecting the refrigeration unit from the trailer. No separate connections between the drag-reducing apparatus and the trailer need to be disconnected to accomplish replacement of the refrigeration unit.

Attaching the drag-reducing apparatus only to the refrigeration unit rather than only to the trailer is preferred. If the drag-reducing apparatus were solely attached to the trailer, replacement time for the refrigeration unit would not be improved. In addition, it is believed that the attachment of the drag-reducing apparatus directly to the trailer provides a shock loading, and this can be reduced by attachment of the drag-reducing apparatus solely and directly to the refrigeration unit. To more positively isolate the refrigeration unit from stresses and vibrations from the trailer, the wind deflector is preferably spaced from the trailer and out of contact with the trailer.

This invention also eliminates the access doors utilized heretofore to provide access to the refrigeration unit. This simplifies the construction of the drag-reducing unit and reduces its initial and maintenance costs. In addition, the outer surface of the drag-reducing unit can be smoother so that a greater fuel saving may be possible. Elimination of the access doors also tends to reduce noise and vibration which can result from doors on vehicles.

This invention greatly improves the access to the refrigeration unit by attaching the wind deflector to the refrigeration unit for movement between a drag-reducing position and an access position. In the drag-reducing position, the wind deflector at least partially encloses the refrigeration unit to reduce the aerodynamic drag of the refrigerated cargo carrying vehicle. In this position, access to the refrigeration unit is inherently substantially diminished in order that the wind deflector can perform its drag-reducing function. However, in the access position, the wind deflector is displaced from the drag-reducing position to provide increased access to the refrigeration unit for inspection, maintenance and repair. Preferably, in the access position, the wind deflector is substantially displaced from its position in the drag-reducing position to provide substantially complete access to the refrigeration unit.

The travel of the wind deflector between its positions can be along a curved path, a linear path or a combination of curved and linear paths. However, in a preferred embodiment, the wind deflector is simply and inexpensively mounted on the refrigeration unit for pivotal movement between the two positions thereof. For example, and not by way of limitation, the wind deflector may be pivoted through about 90 degrees. Another advantage of pivoting the wind deflector is that, in the access position, the wind deflector can be utilized as a rain or sun shield for the workman.

A pivotable fairing for a domestic travel trailer is known from DeVaughn U.S. Pat. No. 3,425,740. However, this patented construction is not attached to a refrigeration unit of a refrigerated cargo carrying vehicle.

The improved access to the refrigeration unit which is obtainable with this invention is of significant advantage for maintenance and repair of the refrigeration unit. In addition, with the wind deflector in the access position, access is provided to the vent door which is customarily provided on the forward or front wall of the trailer for venting gases which build up from outgassing of some products carried within the trailer. In addition, in the access position, access is provided to the ladder and handhold commonly found on the front wall of refrigerated trailers.

The wind deflector can be of any configuration which reduces the aerodynamic drag of the refrigerated trailer. For example, the wind deflector can advantageously include a curved, generally forwardly facing wind deflecting wall which extends around the front and side walls of the refrigeration unit. The forward wall of the wind deflector has a single opening to provide air to the refrigeration unit and is preferably otherwise devoid of openings which provide access to the refrigeration unit. Preferably, the forward wall is otherwise continuous and devoid of openings or doors for providing access to the refrigeration unit.

A typical refrigeration unit has control means in the form of gages and/or manually operable controls to which the operator must have periodic access. To facilitate this access, the wind deflector, and preferably the forwardly facing wall thereof, has a removed region through which access to the control means can be directly had. In a preferred construction, the removed region is adjacent a lower edge and adjacent a side edge of the forward wall in the drag-reducing position. The forward wall also has at least one recess to at least partially accommodate the handhold on the trailer in the drag-reducing position.

Locking means is provided on the refrigeration unit and the wind deflector for holding the wind deflector in the drag-reducing position. The locking means can advantageously be provided near the lower edge portion of the wind deflector, and the pivot axis for the wind deflector can advantageously be provided adjacent the upper end of the wind deflector. A resilient seal can be provided between the lower edge portion of the wind deflector and the refrigeration unit for sealing purposes and to cushion the wind deflector against the refrigeration unit.

The invention, together with further features and advantages thereof, may best be understood by reference to the following description taken in connection with the accompanying illustrative drawing.

DESCRIPTION OF THE PREFERRED EMBODIMENT

Figure 1:
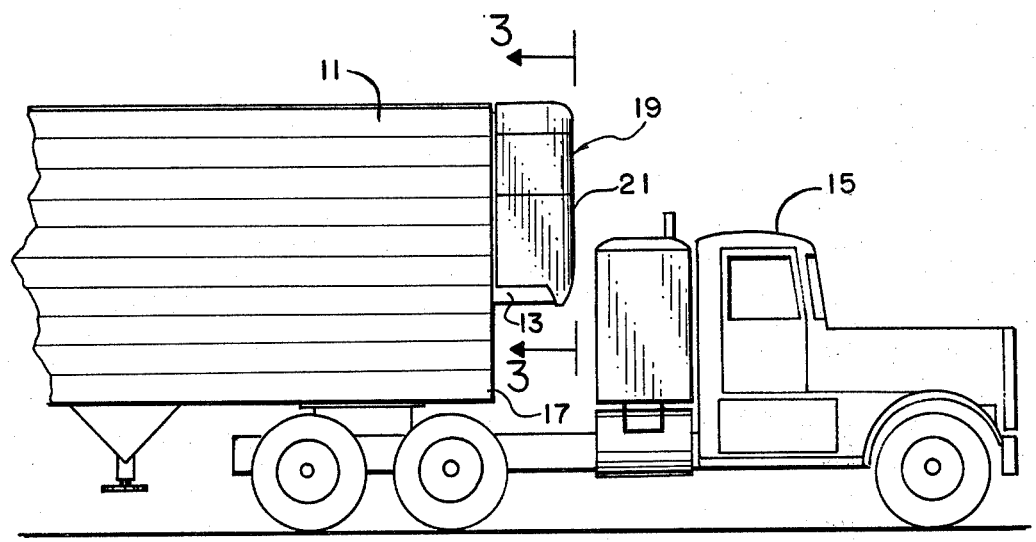
FIG. 1 is a fragmentary side elevational view of a tractor and refrigerated trailer with a wind deflector mounted on the refrigeration unit. The wind deflector is in the drag-reducing position.
Figure 2:
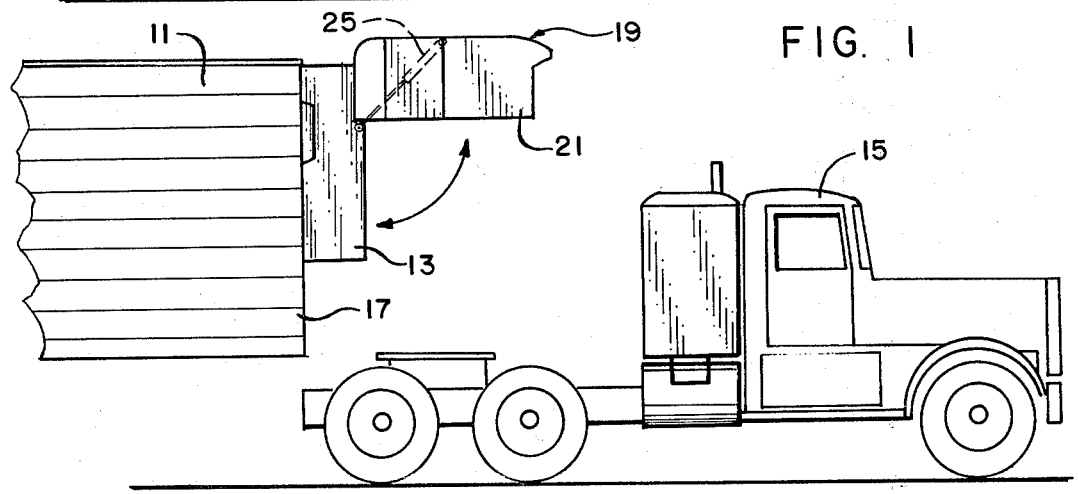
FIG. 2 is a side elevational view similar to FIG. 1 with the wind deflector in the access position.

FIGS. 1 and 2 show a trailer 11, a refrigeration unit 13 for cooling the interior of the trailer 11 and a tractor 15 for pulling the trailer. The trailer 11 and the tractor 15 are typical of cargo carrying vehicles of the type with which this invention may be used. The trailer 11 has a front or forward wall 17, and the refrigeration unit 13 is mounted on the front wall 17 in a conventional manner. The trailer 11, the refrigeration unit 13 and the tractor 15 may all be conventional. By way of example, the refrigeration unit may be of the type presently sold under the trademark Thermo-King, and this type of refrigeration unit is in widespread use.

Figure 6:
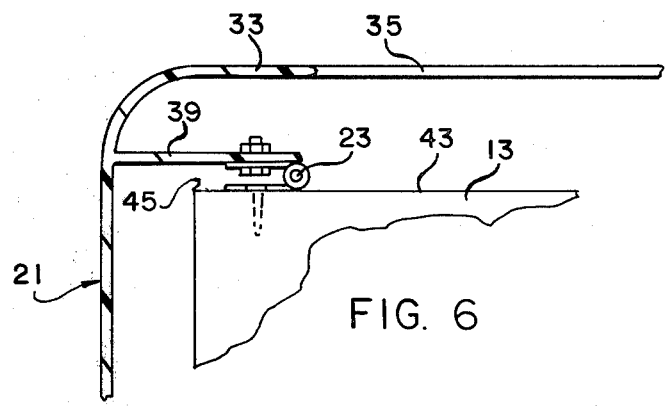
FIG. 6 is an enlarged fragmentary sectional view taken generally along line 6—6 of FIG. 3 and showing a typical hinge for pivotally mounting the wind deflector on the refrigeration unit.

To reduce the aerodynamic drag, a drag-reducing apparatus 19 is utilized. The drag-reducing apparatus 19 includes a wind deflector 21, hinges 23 (FIGS. 4 and 6) for pivotally attaching the wind deflector 21 to the top of the refrigeration unit 13, air cylinders 25 (FIGS. 2 and 7) for urging the wind deflector 21 toward the access position of FIG. 2 and locking means in the form of tie downs 27 (FIG. 3) for locking the wind deflector in the drag-reducing position of FIG. 1. The wind deflector 21 can be constructed of various different materials. For example, the wind deflector may be molded integrally from a suitable reinforced or unreinforced plastic material. By way of example, the wind deflector may be molded from fiberglass.

The primary purpose of the wind deflector 21 is to reduce the aerodynamic drag of the vehicle when the vehicle is moving forward. The wind deflector 21 may have any appropriate configuration which will achieve this objective. In the embodiment illustrated, the wind deflector 21 includes a curved, generally forwardly facing wind deflecting wall 29. The wall 29 is aerodynamically configured to substantially reduce the aerodynamic drag of the vehicle. The wall 29 preferably has a smooth, continuous, forwardly facing surface and a single opening 31 which provides air to the refrigeration unit 13. Preferably, the forward wall 29 is devoid of other openings for providing access to the refrigeration unit 13. As best shown in FIGS. 1 and 3-5, the wall 29 essentially encloses the front wall and both side walls of the refrigeration unit 13 in the drag-reducing position.

Figure 3:
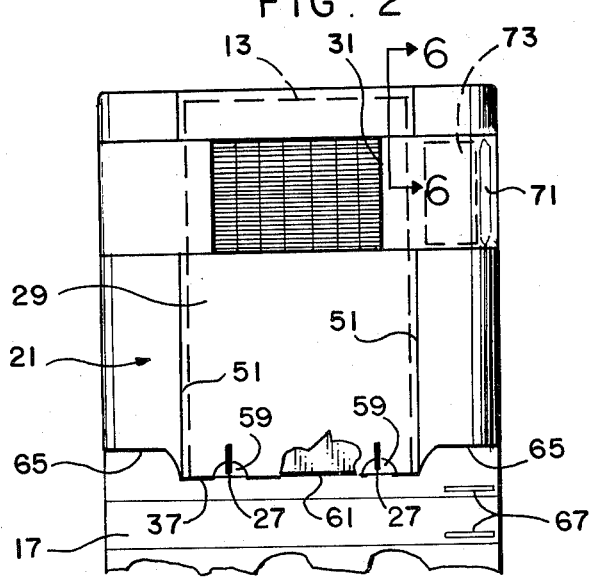
FIG. 3 is a fragmentary elevational view taken generally along line 3—3 of FIG. 1.

The wind deflector 21 has a narrow flange 33 (FIG. 4) forming a short top wall for the wind deflector. This leaves a relatively large top opening 35 above the refrigeration unit 13 which can be used for the exhaust for the refrigeration unit. The wind deflector 21 also has a narrow flange forming a short bottom wall 36 (FIG. 5) of the wind deflector 21, and this defines a large bottom opening 37 (FIG. 3). The bottom wall 36 is configured to lie along the front wall of the refrigeration unit.

The wind deflector 21 is attached to the refrigeration unit 13 for movement between a drag-reducing position (FIG. 1) and an access position (FIG. 2). Although this movement may be along different paths, in the embodiment illustrated, the wind deflector 21 is pivotally attached to the refrigeration unit 13. Although this may be accomplished in different ways, in the embodiment illustrated, the wind deflector 21 has a strong structural web 39 either integral therewith or attached thereto just below the flange 33. The hinges 23 are suitably attached to an upper wall 43 of the refrigeration unit 13 and to the web 39. This enables pivotal movement of the wind deflector 21 about a pivot axis which is defined by the hinges 23 and which lies adjacent an upper forward edge 45 of the refrigeration unit 13. The large top opening 35 allows this pivotal movement to occur without mechanical interference between the wind deflector 21 and the upper wall 43 of the refrigeration unit 13. The web 39 may be reinforced as necessary to provide it with adequate strength for pivotal mounting of the wind deflector.

Figure 7:
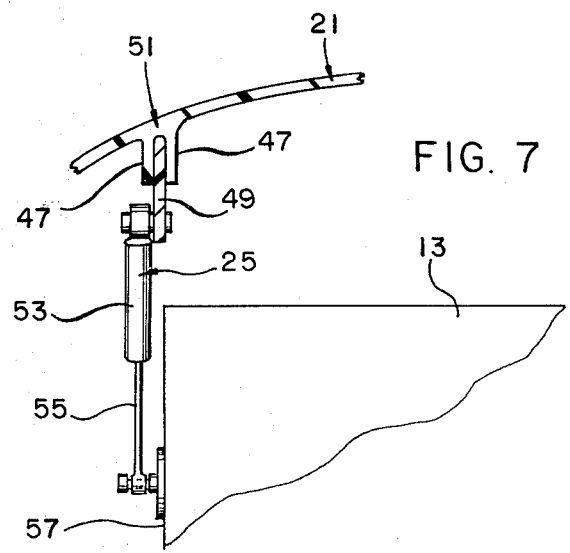
FIG. 7 is an enlarged fragmentary sectional view taken generally along line 7—7 of FIG. 5 and illustrating one way of moving the wind deflector between the drag-reducing position and the access position.

The wind deflector 21 may be moved into and held in the access position of FIG. 2 in different ways. By way of example, one or more of the air cylinders 25 may be utilized. The air cylinders 25 may be of the same type commonly employed on the back or trunk door of hatchback automobiles. As shown in FIG. 7, the wind deflector 21 has a pair of integral, longitudinally extending, inwardly projecting legs 47 which define a channel for receiving a reinforcing rib 49, with the reinforcing rib being generally aligned with a longitudinal indentation 51 on the forward or outwardly facing surface of the wind deflector 21. The air cylinder 25 comprises a housing 53 suitably pivotally attached to the rib 49 and a rod 55 suitably pivotally attached to a side wall 57 of the refrigeration unit 13. Preferably, a second air cylinder is similarly mounted to the wind deflector 21 and the refrigeration unit 13 on the other side of the wind deflector.

The housing 53 contains a gas and/or springs which are compressed when the air cylinder 25 is retracted due to manually moving the wind deflector 21 to the drag-reducing position and which expands to urge the air cylinder to extend to move the wind deflector to the access position. When the wind deflector 21 has been raised to the access position of FIG. 2, the air cylinders cooperate to hold the wind deflector in the raised access position. The resilient force provided by the air cylinders 25 can be manually overcome to return the wind deflector 21 to the drag-reducing position of FIG. 1.

The wind deflector 21 has a pair of notches 59 (FIG. 3) along its lower edge to expose small regions of the forward wall of the refrigeration unit 13 adjacent the lower edge of the refrigeration unit. This enables tie downs 27, which may be of any conventional design, to be attached to the exposed regions of the refrigeration unit 13 at the notches 59 and to the wind deflector 21. By way of example, each of the tie downs 27 may be in the form of a strap affixed at one end to the exposed regions of the refrigeration unit 13 at the notches 59 and suitably buckled or attached to the outer surface of the wall 29 just above the notches 59. The tie downs 27 may be of any design which will tightly hold the wind deflector 21 in the drag-reducing position. Preferably, a resilient rubber seal 61 (FIG. 3) is carried by the bottom wall 36 and is pressed against the refrigeration unit 13 in the drag-reducing position.

Figure 4:
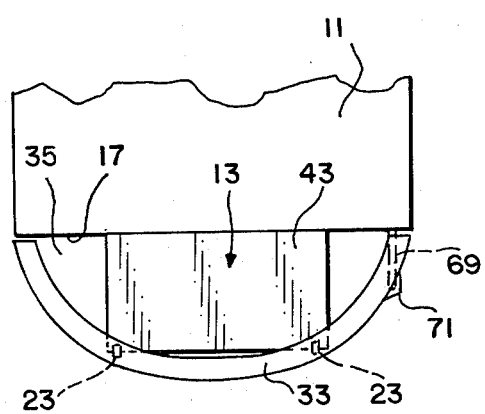
FIG. 4 is a top plan view of the drag-reducing apparatus, the refrigeration unit and a portion of the refrigerated trailer.
Figure 5:
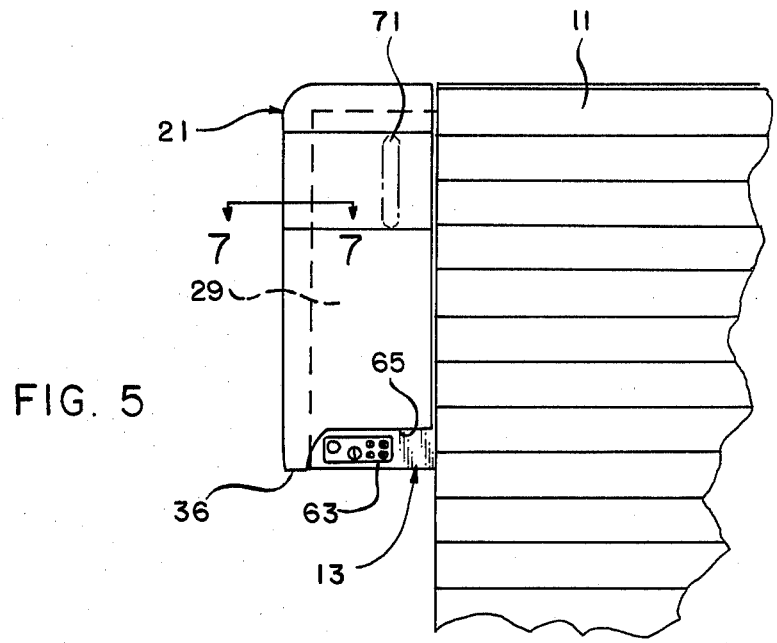
FIG. 5 is a fragmentary side elevational view of the drag-reducing apparatus, the refrigeration unit and the trailer showing the side which is hidden in FIG. 2.

With the drag-reducing apparatus 19 mounted on the refrigeration unit 13 in this manner, the wind deflector 21 is spaced from the trailer 11 as best shown in FIGS. 4 and 5 and does not engage or come in contact with the trailer. The drag-reducing apparatus is attached solely to the refrigeration unit 13 and is unattached to the trailer 11, except by way of the refrigeration unit. In the drag-reducing position of FIG. 1, the forward wall and both side walls of the refrigeration unit 13 are substantially enclosed so that a significant fuel savings results from the reduction in aerodynamic drag. The wind deflector 21 can be pivoted to the access position by unlocking the tie downs 27 and allowing the air cylinders 25 to raise the wind deflector about the hinges 23 to the position of FIG. 2. In this position, access to the entire refrigeration unit 13 is provided.

To raise the wind deflector 21 to the access position, the tractor 15, in the embodiment illustrated, must be separated from the trailer 11 and pulled forward to allow clearance for raising of the wind deflector. For some units, adequate clearance between the refrigeration unit and the tractor 15 will exist so that separation of the tractor and trailer is not required.

The entire refrigeration unit 13 and drag-reducing apparatus 19 can be removed from the trailer 11 by simply demounting the refrigeration unit. Accordingly, the refrigeration unit 13 and its drag-reducing apparatus 19 can be quickly and easily replaced in case of a serious malfunction.

The drag-reducing apparatus 19 has other features. For example, the refrigeration unit 13 has control means 63 (FIG. 5) which includes various gages and/or manually operable controls. The control means 63 is rendered visible and readily accessible by virtue of a removed region 65 in the wall 29 of the wind deflector 21. As shown in FIGS. 3 and 5, the removed region 65 is along the lower side edge of the wall 29. Although the control means 63 is provided only on one side of the refrigeration unit 13, removed regions 65 are preferably provided on both sides of the wall 29 as shown in FIG. 3 to provide symmetry in the design.

The refrigerated trailer 11 has ladder steps 67 (FIG. 3) and a handhold 69 (FIG. 4) for use by the operator when standing on the ladder steps. To accommodate the handhold 69, the wall 29 has an elongated vertically extending dimple 71 which provides an elongated inner recess for partially receiving the handhold. Although typically only one of the handholds 69 is provided, the wall 29 may have another dimple to accommodate another handhold if desired.

The refrigerated trailer 11 has a vent door 73 adjacent the refrigeration unit 13 which is covered by the wind deflector 21 when the latter is in the drag-reducing position. However, with this invention, the vent door 73 is fully exposed and accessible with the wind deflector 21 in the access position. This enables the operator to open the vent door to vent gases which may build up within the trailer 11 as a result of out-gassing of the product carried by the trailer.

Although an exemplary embodiment of the invention has been shown and described, many changes, modifications and substitutions may be made by one having ordinary skill in the art without necessarily departing from the spirit and scope of this invention.

I claim:

1. An apparatus for reducing the aerodynamic drag of a refrigerated cargo carrying vehicle of the type having a front wall and a refrigeration unit on said front wall, said apparatus comprising:

a wind deflector for at least partially enclosing the refrigeration unit and configured to reduce the aerodynamic drag of the vehicle; and means for attaching the wind deflector to the refrigeration unit for movement between a drag reducing position in which the wind deflector at least partially encloses the refrigeration unit to reduce the aerodynamic drag of the vehicle when the vehicle is moving forward whereby access to the refrigeration unit is limited and an access position in which the wind deflector is displaced from the drag-reducing position to provide increased access to the refrigeration unit.

2. An apparatus as defined in claim 1 wherein the wind deflector is spaced from the vehicle in the drag-reducing position.

3. An apparatus as defined in claim 1 wherein said attaching means attaches the wind deflector solely to the refrigeration unit and the wind deflector is unattached to the vehicle except via the refrigeration unit.

4. An apparatus as defined in claim 1 wherein the refrigeration unit has control means and the wind deflector has a removed region through which access can be had to the control means in the drag-reducing position.

5. An apparatus as defined in claim 4 wherein said wind deflector includes a generally forwardly facing wind deflecting wall and the removed region is in said wall adjacent a lower edge and adjacent a side edge of said wall in the drag-reducing position.

6. An apparatus as defined in claim 1 wherein the vehicle has at least one handhold and the wind deflector has a recess to at least partially accommodate the handhold in the drag-reducing position.

7. An apparatus as defined in claim 1 wherein the wind deflector has a curved forwardly facing wind deflecting wall, said curved forwardly facing wind deflecting wall having an opening to provide air to the refrigeration unit and otherwise being continuous and devoid of openings for providing access to the refrigeration unit.

8. An apparatus as defined in claim 1 wherein said attaching means mounts the wind deflector on the refrigeration unit for pivotal movement between said drag-reducing position and said access position.

9. An apparatus as defined in claim 8 including locking means on the refrigeration unit and on said wind deflector for holding the wind deflector in the drag-reducing position.

10. An apparatus as defined in claim 9 wherein said wind deflector has upper and lower edge portions in said drag-reducing position, said wind deflector pivots between said positions thereof about a pivot axis located adjacent said upper edge portion, said locking means being coupled to said wind deflector adjacent said lower edge, and sealing means between said lower edge portion and said refrigeration unit in said drag-reducing position.

11. An apparatus as defined in claim 9 wherein said attaching means attaches the wind deflector solely to the refrigeration unit and the wind deflector is unattached to the vehicle except via the refrigeration unit.

12. An apparatus as defined in claim 11 wherein said wind deflector is spaced from the vehicle in the drag-reducing position, the refrigeration unit has control means, the wind deflector has a curved forwardly facing wind deflecting wall having a single opening therein to provide air to the refrigeration unit, said wind deflector having a removed region adjacent a lower edge thereof in the drag-reducing position through which access can be had to the control means in the drag-reducing position.

13. An apparatus for reducing the aerodynamic drag of a refrigerated cargo carrying vehicle of the type having a front wall and a refrigeration unit on said front wall, said apparatus comprising:
   a wind deflector for at least partially enclosing the refrigeration unit and configured to reduce the aerodynamic drag of the vehicle; and
   means for attaching the wind deflector solely to the refrigeration unit with the wind deflector at least partially enclosing the refrigeration unit to reduce the aerodynamic drag of the refrigerated vehicle when the vehicle is moving forward whereby the wind deflector is unattached to the vehicle except via the refrigeration unit.

14. An apparatus as defined in claim 13 wherein the wind deflector is out of contact with the vehicle.

15. An apparatus as defined in claim 13 wherein the refrigeration unit has control means and the wind deflector has a removed region through which access can be had to the control means.

16. An apparatus as defined in claim 15 wherein said wind deflector includes a generally forwardly facing wind deflecting wall and the removed region is in said wall adjacent a lower edge and adjacent a side edge of said wall.

17. An apparatus as defined in claim 13 wherein the vehicle has at least one handhold and the wind deflector has a recess to at least partially accommodate the handhold in the drag-reducing position.

18. An apparatus as defined in claim 13 wherein the wind deflector has a curved forwardly facing wind deflecting wall, said curved forwardly facing wind deflecting wall has an opening to provide air to the refrigeration unit, and said wind deflector has a top opening and a bottom opening.

19. An apparatus as defined in claim 8 wherein the wind deflector has at least one notch in the lower edge thereof which exposes a region of the refrigeration unit and said apparatus includes locking means coupled to said region and said wind deflector adjacent said notch for releasably locking the wind deflector in the drag-reducing position.

20. An apparatus as defined in claim 8 including air cylinder means for urging the wind deflector toward the access position.

* * * * *